United States Patent Office 3,808,181
Patented Apr. 30, 1974

---

3,808,181
TRANSPARENT THERMOPLASTICALLY-FORMABLE POLYAMIDES
Werner Nielinger, Krefeld, Hans Rudolph, Krefeld-Bockum, and Kurt Schneider, Krefeld, Germany, assignors to Bayer Aktiengesellschaft, Leverkusen, Germany
No Drawing. Filed July 9, 1971, Ser. No. 161,927
Claims priority, application Germany, July 11, 1970, P 20 34 541.9; May 25, 1971, P 21 25 906.3
Int. Cl. C08g 20/20
U.S. Cl. 260—78 R                           7 Claims

ABSTRACT OF THE DISCLOSURE

The invention relates to transparent thermoplastically processable polyamides and to a process for their production from bis-(4-aminocyclohexyl)-methane and 3-ethyl-1,10-decane dicarboxylic acid, optionally in conjunction with other dicarboxylic acids, or from derivatives of the acids. The invention also relates to a process for the production of transparent thermoplastically processable polyamides which comprises polycondensing bis-(4-amino-cyclohexyl)-methane, from 40 to 70% of whose cyclohexane rings are trans-oriented with a dicarboxylic acid, or an ester or acid derivative thereof, which dicarboxylic acid comprises from 5 to 100 mol percent of 3-ethyl-1,10-decane dicarboxylic acid and from 0 to 95 mol percent of an additional dicarboxylic acid or acids having 6 to 16 carbon atoms.

---

This invention relates to transparent thermoplastically processable polyamides and to a process for their production from bis-(4-aminocyclohexyl)-methane and 3-ethyl-1,10-decane dicarboxylic acid, optionally in conjunction with other dicarboxylic acids, or from derivatives of the acids.

Polyamides obtained from bis-(4-aminocyclohexyl)-methane and linear aliphatic dicarboxylic acids are known. These polyamides are hazy when they are produced from a mixture of bis-(4-aminocyclohexyl)-methane isomers which is solid at temperatures above room temperature. According to U.S. patent specifications Nos. 2,494,563 and 2,585,163 for example, it is not possible to obtain transparent polyamides from a bis-(4-aminocyclohexyl)-methane isomer mixture of this kind and adipic acid, glutaric acid or sebacic acid. Our own tests have shown that polyamides obtained from the aforementioned diamine and dodecane dicarboxylic acid are hazy. Another disadvantage is that the softening range of polyamides obtained from bis-(4-aminocyclohexyl)-methane and linear dicarboxylic acids is relatively high, so that complications are encountered in producing the polyamides by melt condensation and in processing the products. Although it is known that mixed polyamides, for example those of the salts of bis-(4-aminocyclohexyl)-methane and adipic acid, hexamethylene diamine and adipic acid and ε-caprolactam are products of low melting point, these products show considerable cold flow, according to Belgian patent specification No. 705,287, are not resistant to organic solvents, and frequently give rise to the formation on heating of spheroliths which in turn gives rise to hazing in the polyamide.

It has now been found that transparent, thermoplastically processable polyamides with outstanding properties can be obtained by polycondensing bis-(4-aminocyclohexyl)-methane and 3-ethyl-1,10-decane dicarboxylic acid or derivatives thereof, such as its esters or acid chlorides. The polyamides may contain up to 25 mol percent of one or more aliphatic or aromatic dicarboxylic acids with 6 to 16 carbon atoms.

Accordingly, it is an object of this invention to provide transparent thermoplastically processable polyamides having a relative solution viscosity (as measured on a solution of 1 g. of polyamide in 100 g. of m-cresol at 25° C.) of at least 1.5, which comprise from 5 to 100 mol percent of recurring structural units corresponding to the general formula:

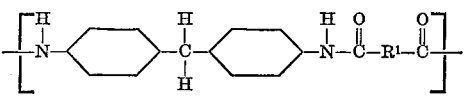

in which from 40 to 70% of the cyclohexane rings of the bis-(4-aminocyclohexyl)-methane radicals are trans-oriented, and $R^1$ represents a radical corresponding to the formula:

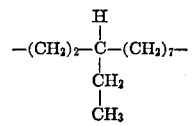

and from 0 to 95 mol percent of recurring structural units corresponding to the general formula:

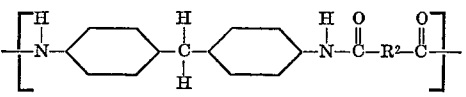

in which from 40 to 70% of the cyclohexane rings of the bis-(4-aminocyclohexyl)-methane radicals are trans-oriented, and $R^2$ represents a divalent radical having 4 to 14 carbon atoms.

Preferably, it is an object of this invention to provide a polyamide which comprises from 75 to 100 mol percent of recurring structural units corresponding to the general formula:

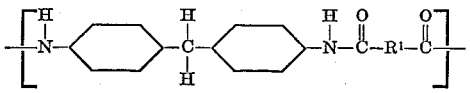

in which from 40 to 70% of the cyclohexane rings of the bis - (4 - aminocyclohexyl) - methane radical are trans-oriented, and $R^1$ represents a radical of the formula:

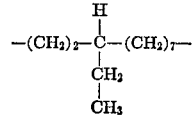

and from 0 to 25 mol percent of recurring structural units corresponding to the general formula:

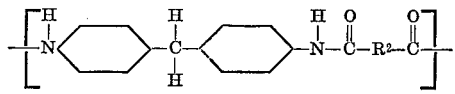

in which from 40 to 70% of the cyclohexane rings of the bis - (4 - aminocyclohexyl) - methane radical are trans-oriented, and $R^2$ represents a divalent radical having 4 to 14 carbon atoms.

It is a further preferred object of this invention to provide a polyamide which comprises from 5 to 75 mol percent of recurring structural units corresponding to the general formula:

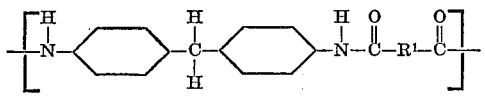

in which from 40 to 70% of the cyclohexane rings of the bis-(4-aminocyclohexyl)-methane radical are trans-oriented, and R¹ represents a radical of the formula:

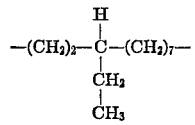

and from 25 to 95 mol percent of recurring structural units corresponding to the general formula:

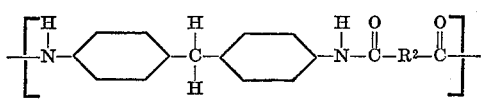

in which from 40 to 70% of the cyclohexane rings of the bis-(4-aminocyclohexyl)-methane radical are trans-oriented, and R² represents a divalent radical having 4 to 14 carbon atoms.

The invention also relates to a process for the production of transparent thermoplastically processable polyamides which comprises polycondensing bis-(4-aminocyclohexyl)-methane, from 40 to 70% of whose cyclohexane rings are trans-oriented, with a dicarboxylic acid, or an ester or acid derivative thereof, which dicarboxylic acid comprises from 5 to 100 mol percent of 3-ethyl-1,10-decane dicarboxylic acid and from 0 to 95 mol percent of an additional dicarboxylic acid or acids having 6 to 16 carbon atoms.

These polyamides are distinguished by a high level of transparency, even in thick layers, and retain this outstanding transparency even after prolonged tempering in air at 100° C. or after storage in hot water. Shaped articles obtained from the polyamides show a highly desirable degree of toughness, and of resistance to moisture and to a number of organic solvents. The moisture absorption factor is low compared with that of the known transparent mixed polyamides.

The polyamides are produced by the melt condensation of equivalent quantities of bis(4-aminocyclohexyl)-methane and 3-ethyl-1,10-decane dicarboxylic acid, of which up to 25 mol percent can be replaced by other dicarboxylic acids containing 6 to 16 carbon atoms. The components are best used in the form of the salts formed from them, and are condensed in an autoclave in the presence of water at a temperature of from 180 to 240° C., either under the natural vapor pressure of the water or under atmospheric pressure. After the solvent water and water of condensation have been distilled off, the reaction is continued at 240 to 320° C. optionally in vacuo, until sufficiently high molecular weights have been obtained.

The bis-(4-aminocyclohexyl)-methane is an isomer mixture consisting predominantly of trans,trans-isomers and, to a lesser extent, of cis,trans- and cis,cis-isomers. It is essential to use an isomer mixture in which from 40 to 70% of the cyclohexane rings are trans-substituted and which has a melting point above 30° C.

Examples of dicarboxylic acids which can be cocondensed instead of the 3-ethyl-1,10-decane dicarboxylic acid include adipic acid, sebacic acid, decane dicarboxylic acid, dodecane dicarboxylic acid, methyl adipic acid, dimethyl adipic acid, isophthalic acid, terephthalic acid and mixtures thereof.

Instead of the dicarboxylic acids themselves, it is also possible to use derivatives thereof for the condensation reaction, for example esters of aliphatic alcohols such as methyl and ethyl esters, or esters of aromatic hydroxy compounds such as phenyl esters.

Finally, the polyamides can be obtained by known methods of solution or interfacial polycondensation from bis-(4-aminocyclohexyl)-methane and the acid chlorides of the dicarboxylic acids.

The transparent polyamides can be processed by known methods, such as injection moulding or extrusion. They can be used inter alia for the production of mouldings, fibres and films.

The polyamides can contain additives such as molecular weight regulators, light and heat stabilizers or lubricants and mould-release agents. These compounds may even be added before, during or after condensation.

The following examples are to further illustrate the invention without limiting it.

EXAMPLE 1

Two mols of bis-(4-aminocyclohexyl)-methane having 65% of trans-oriented cyclohexane rings, 1.8 mols of 3-ethyl-1,10-decane dicarboxylic acid and 0.2 mol of 1,12-dodecane dicarboxylic acid are heated in an autoclave to 110° C. with 40% by weight of water. The temperature is increased to 270° C. over a period of 5 hours. The water distills off through a 35 cm. long column filled with Wilson spirals. After another 2.5 hours, the pressure is reduced to from 0.1 to 0.5 torr over a period of 1 to 2 hours. The reaction is completed after another hour at 0.1 torr/270° C.

A transparent colorless polyamide is obtained which can be spun out into water in the form of a bristle and chopped up. After drying, it can be processed into mouldings without any need for extraction beforehand.

The polyamide has a relative solution viscosity of $\eta_{rel}=3.2$ as measured on a 1% by weight solution in m-cresol. It begins to soften at a temperature of 210° C., as measured on a Kofler heating bench. The second-order transition temperature is 128° C., as determined by differential thermo-analysis.

The polyamide obtained by the process described above was processed into different test specimens in a standard screw injection moulding machine. The injection temperatures were between 260 and 270° C. An average injection rate was selected to provide an injection pressure of 1100 kp./cm.². The machine was equipped with a back-flow gate and an open die. The cycle for producing 4 mm. thick test specimens was 25 seconds long.

Experimentally produced cylindrical injection mouldings 10 mm. in diameter did not show any signs of hazing even with these wall thicknesses. The material was not seen to undergo any optically recognizable changes after subsequent tempering at 120° C. in a recirculating air cabinet.

The physical characteristics set out in the following table was determined on the injected test specimens (in a dry injection-fresh form).

| Test | Standard | Physical properties |
| --- | --- | --- |
| Density | DIN 53 479 | 1.02 g./cc. |
| Tensile stress yield point | DIN 53 455 | 590 kp./cm.². |
| Breaking stress | DIN 53 455 | 560 kp./cm.². |
| Breaking elongation | DIN 53 455 | 130 percent. |
| E-modulus | DIN 53 455 | 15,000 kp./cm.². |
| Notched impact strength | DIN 53 453 | 7 kp.cm./cm.². |
| Ball indentation hardness: | | |
| HC 10 | DIN 53 456 | 9.5 kp./mm.². |
| HC 60 | DIN 53 456 | 9.0 kp./mm.². |
| Dimensional stability under heat: | | |
| According to Martens | DIN 53 458 | 70° C. |
| According to Vicat | VDE 0302 | 130° C. |
| Water absorption (saturation at 100° C.) | | 2.5 percent. |

EXAMPLE 2

0.1 mol of the bis-(4-aminocyclohexyl)-methane according to Example 1 and 0.1 mol of 3-ethyl-1,10-decane dicarboxylic acid methyl ester are heated to 180° C.

The temperature is increased to 270° C. over a period of 2 hours, during which ethanol is distilled off through a column filled with Wilson spirals. Condensation is completed over a period of 6 hours at 270° C., initially at 20 torr and then at 0.1 to 0.5 torr. A transparent polyamide with a relative solution viscosity of $\eta_{rel}=2.1$, as measured on a 1% by weight solution in m-cresol, is obtained.

EXAMPLE 3

0.9 mol of 3-ethyl-1,10-decane dicarboxylic acid and 0.1 mol of 1,12-dodecane dicarboxylic acid are dissolved in a mixture of 1000 ml. of benzene and 200 ml. of ethanol. A solution of 1.0 mol of bis-(4-aminocyclohexyl)-methane in 1000 ml. of benzene is then added dropwise at 70° C. The salt precipitated is filtered under suction, washed with benzene and dried. M.P., 177 to 179° C.

Condensation of the salt in the manner described in Example 1, gives a polyamide with a relative solution viscosity of $\eta_{rel}=3.0$

EXAMPLE 4

A mixture of 0.8 mol of 3-ethyl-1,10-decanedicarboxylic acid, 0.1 mol of 1,12-dodecane dicarboxylic acid and 0.1 mol of adipic acid is condensed as in Example 1 with an equivalent quantity of bis-(4-aminocyclohexyl)-methane. A transparent polyamide with a relative solution viscosity of $\eta_{rel}=3.19$ and a softening point of 200° C. is obtained.

EXAMPLE 5

0.05 mol of bis-(4-aminocyclohexyl)-methane are dissolved in 150 ml. of carbon tetrachloride. Following the addition of 0.1 mol of potassium hydroxide in 300 ml. of water, 0.05 mol of 3-ethyl-1,10-decane-dicarboxylic acid dichloride are added dropwise with vigorous stirring. The polyamide powder precipitated is converted into a transparent moulding after it has been washed out and dried.

EXAMPLE 6

210.36 g. of bis-(4-aminocyclohexyl)-methane, 114.56 g. of a mixture of 90% by weight of 3-ethyl-1,10-decane-dicarboxylic acid methyl ester and 10% by weight of 1,12-dodecane dicarboxylic acid methyl ester are precondensated with 99.68 g. of isophthalic acid (60 mol percent of the acids) and 318 g. of water over a period of 6 hours at 90° C. in an atmosphere of nitrogen. Thereafter a major part of the water and the methanol splitted off is distilled off. A further condensation is effected over a period of 6 hours at a temperature of 280° C. and is finished after heating to a temperature of 285° C. for 2 hours. The polyamide melt is spun out into water in the form of a bristle and chopped up. After drying it can be processed into mouldings.

The transparent colorless polyamide has a relative solution viscosity of $\eta_{rel}=2.9$ (c.=1 g./100 ml. m-cresol). The softening range is about 220° C. After treating over a period of 50 hours in boiling water or in a boiling 20% by weight solution of sodium hydroxide, the product shows no alterations as to its properties.

EXAMPLE 7

210.36 g. of bis-(4-aminocyclohexyl)-methane, 57.2 g. of a mixture of 90% by weight of 3-ethyl-1,10-decane-dicarboxylic acid methyl ester and 10% by weight of 1,12-dodecane dicarboxylic acid methyl ester and 132.90 g. of a mixture (80 mol percent of the acids) of 85% by weight of isophthalic acid and 15% by weight of terephthalic acid are polycondensated according to Example 1. A transparent colorless polyamide is obtained with a relative solution viscosity of $\eta_{rel}=2.0$ (c.=1.0 g./100 ml. m-cresol).

EXAMPLE 8

21.3 g. (0.1 mol) of bis-(4-aminocyclohexyl)-methane, 15.5 g. (0.06 mol) of a mixture of 90% by weight of 3-ethyl-1,10-decane-dicarboxylic acid and 10% by weight of 1,12-dodecane dicarboxylic acid and 6.64 g. (0.04 mol) isophthalic acid are slowly heated to a temperature of 270° C. and polycondensated at this temperature over a period of 7 hours in an atmosphere of nitrogen with stirring. A transparent thermoplastic polyamide with a relative solution viscosity of $\eta_{rel}=2.80$ (c.=1.0 g./100 ml. m-cresol) and with a softening range of about 225° C. is obtained.

EXAMPLE 9

0.06 mol of a salt of bis-(4-aminocyclohexyl)-methane and a mixture of 90% by weight of 3-ethyl-1,10-decane-dicarboxylic acid and 10% by weight of 1,12-dodecane dicarboxylic acid are heated together with 0.04 mol of a salt of bis-(4-aminocyclohexyl)-methane and a mixture of 85% by weight of isophthalic acid and 15% by weight of terephthalic acid to a temperature of 280° C. over a period of 1 hour and thereafter to a temperature of 290° C. over a period of 6 hours. A condensation is effected by stirring in an atmosphere of nitrogen. A colorless buff transparent polyamide with a relative solution viscosity of $\eta_{rel}=2.5$ (c.=1.0 g./100 ml. of m-cresol) and a softening range which begins at a temperature of 200° C. is obtained.

What we claim is:

1. The transparent, thermoplastic polyamide having a relative solution viscosity, as measured on a solution of 1 gram of the polyamide in 100 grams of m-cresol at 25° C. of at least 1.5, and which consists essentially of from 5 to 100 mol-percent of recurring structural units corresponding to the general formula:

in which 40 to 70% of the cyclohexylene rings of the said Formula I are trans-oriented and $R_1$ represents a hydrocarbon radical of the formula

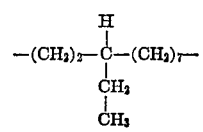

and from 0 to 95 mol-percent of recurring structural units corresponding to the general formula

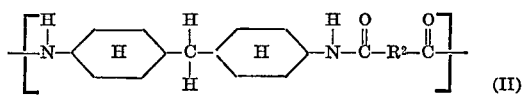

in which from 40 to 70% of the cyclohexylene rings of the said recurring structural units (II) are trans-oriented and $R_2$ represents a divalent hydrocarbon radical selected from the group consisting of butylene, methyl butylene, dimethylbutylene, octylene, decylene, dodecylene, m-phenylene, p-phenylene, and mixtures thereof.

2. The polyamide of claim 1 which consists essentially of 75 to 100 mol-percent of the recurring structural units of the Formula I and from 0 to 25 mol-percent of recurring structural units of the Formula II.

3. The polyamide as claimed in claim 1 which consists essentially of 5 to 75 mol-percent of recurring structural units of the Formula I and 25 to 95 mol-percent of recurring structural units of the Formula II.

4. The polyamide as claimed in claim 1 wherein $R_2$ is selected from the group consisting of n-butylene, n-octylene, n-dodecylene, m-phenylene and mixtures thereof.

5. The polyamide as claimed in claim 4 wherein the divalent radical $R_2$ is a mixture of n-butylene and n-dodecylene in a molar ratio of 1:1.

6. The polyamide as claimed in claim 4 wherein $R_2$ represents a mixture of n-octylene and n-dodecylene in a molar ratio of 1:1.

7. The polyamide as claimed in claim 4 wherein $R_2$ represents a mixture of n-dodecylene and m-phenylene in a molar ratio of 2:1.

(References on following page)

References Cited

UNITED STATES PATENTS

| | | | |
|---|---|---|---|
| 3,393,210 | 7/1968 | Speck | 260—78 R |
| 3,416,302 | 12/1968 | Knospe | 260—78 R |
| 3,598,789 | 8/1971 | Tippetts | 260—78 R |
| 2,512,606 | 6/1950 | Bolton et al. | 260—78 R |
| 2,585,163 | 2/1952 | Pease et al. | 260—78 R |

HAROLD D. ANDERSON, Primary Examiner

U.S. Cl. X.R.

260—33.4 R